US009227582B2

(12) United States Patent
Katayama et al.

(10) Patent No.: US 9,227,582 B2
(45) Date of Patent: Jan. 5, 2016

(54) VEHICLE MOUNTING STRUCTURE FOR BATTERIES

(71) Applicant: HONDA MOTOR CO., LTD., Tokyo (JP)

(72) Inventors: Goichi Katayama, Wako (JP); Koichi Yamamoto, Wako (JP); Yasuaki Hotozuka, Wako (JP); Ryo Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/353,302

(22) PCT Filed: Nov. 9, 2012

(86) PCT No.: PCT/JP2012/079099
§ 371 (c)(1),
(2) Date: Apr. 22, 2014

(87) PCT Pub. No.: WO2013/073464
PCT Pub. Date: May 23, 2013

(65) Prior Publication Data
US 2014/0284125 A1    Sep. 25, 2014

(30) Foreign Application Priority Data

Nov. 14, 2011   (JP) ................................. 2011-248429

(51) Int. Cl.
*B60K 1/04* (2006.01)
*B60L 11/18* (2006.01)
(Continued)

(52) U.S. Cl.
CPC . *B60R 16/04* (2013.01); *B60K 1/04* (2013.01); *B60L 11/1877* (2013.01);
(Continued)

(58) Field of Classification Search
CPC ............... B60K 1/04; B60K 2001/005; B60K 2001/0405; B60K 2001/0422; B60K 2001/0433; B60K 2001/0438; B60K 2001/0472
See application file for complete search history.

(56) References Cited

U.S. PATENT DOCUMENTS 5,501,289 A * 3/1996 Nishikawa et al. .......... 180/68.5
6,648,085 B2 * 11/2003 Nagura et al. ............... 180/65.1
(Continued)

FOREIGN PATENT DOCUMENTS

JP    06-115360 A    4/1994
JP    07-001972 A    1/1995
(Continued)

OTHER PUBLICATIONS

International Search Report dated Jan. 29, 2013, issued in corresponding application No. PCT/JP2012/079099.
(Continued)

*Primary Examiner* — Frank Vanaman
(74) *Attorney, Agent, or Firm* — Westerman, Hattori, Daniels & Adrian, LLP (57) ABSTRACT

When a battery case (24) housing a plurality of batteries (42) is mounted on the vehicle body frame (11) that includes a cross member (20) extending in a vehicle width direction, the cross member (20) of the vehicle body frame (11) is disposed within the recess portion (39b), extending in the vehicle width direction, that is formed in the battery case (24), and therefore, it is possible to mount the battery case (24) while avoiding interference with the cross member (20). Although the intermediate part in the fore-and-aft direction of the battery case (24) housing heavy batteries (42) is susceptible to downward deformation, it is possible to prevent deformation of the battery case (24) by fixing the recess portion (39b) of the battery case (24) to the cross member (20) by fixing means (54).

6 Claims, 9 Drawing Sheets (51) Int. Cl.
  *B60R 16/04* (2006.01)
  *B62D 21/07* (2006.01)
  *H01M 2/10* (2006.01)
  B60K 11/06 (2006.01)
  B60K 1/00 (2006.01)

(52) U.S. Cl.
  CPC ............ *B60L 11/1879* (2013.01); *B62D 21/07* (2013.01); *H01M 2/1077* (2013.01); *H01M 2/1083* (2013.01); *B60K 11/06* (2013.01); *B60K 2001/005* (2013.01); *B60K 2001/0438* (2013.01); *Y02T 10/7005* (2013.01); *Y02T 10/7055* (2013.01)

(56) References Cited

U.S. PATENT DOCUMENTS

| | | | |
|---|---|---|---|
| 7,641,017 B2 * | 1/2010 | Nozaki et al. | 180/291 |
| 2002/0187382 A1 * | 12/2002 | Nishiumi et al. | 429/34 |
| 2009/0186266 A1 | 7/2009 | Nishino et al. | |
| 2010/0294580 A1 * | 11/2010 | Kubota et al. | 180/68.1 |
| 2013/0229030 A1 * | 9/2013 | Yamaguchi et al. | 296/193.07 |

FOREIGN PATENT DOCUMENTS

| | | |
|---|---|---|
| JP | 07-052659 A | 2/1995 |
| JP | 07-246843 A | 9/1995 |
| JP | 2000-100481 A | 4/2000 |
| JP | 2001-088564 A | 4/2001 |
| JP | 2004-58697 A | 2/2004 |
| JP | 2009-087646 A | 4/2009 |
| JP | 2009-87737 A | 4/2009 |

OTHER PUBLICATIONS

Office Action dated Dec. 3, 2014, issued in counterpart Japanese Patent Application No. 2013-544241 (7 pages).

* cited by examiner

VEHICLE MOUNTING STRUCTURE FOR BATTERIES

TECHNICAL FIELD

The present invention relates to a vehicle mounting structure for batteries in which in order to mount a battery case housing a plurality of batteries on a vehicle body frame comprising a cross member extending in a vehicle width direction, the battery case has formed therein a recess portion extending in the vehicle width direction, and the cross member is disposed within the recess portion.

BACKGROUND ART

Such a vehicle mounting structure for batteries is known from Patent Document 1 below.

In accordance with this vehicle mounting structure for batteries, providing a cross member enables the stiffness of a vehicle body frame to be enhanced and a battery case to be mounted at a desired position of the vehicle body frame while avoiding interference between the battery case and the cross member, and this enables a balance to be achieved between ensuring a minimum ground clearance between the battery case and a road surface and ensuring the capacity of a vehicle compartment above the battery case.

RELATED ART DOCUMENTS

Patent Documents

Patent Document 1: Japanese Patent Application Laid-open No. 2009-87646

SUMMARY OF THE INVENTION

Problems to be Solved by the Invention

The shape of a battery case is often long in the vehicle body fore-and-aft direction so as to be commensurate with the shape of a vehicle body frame, and an intermediate part thereof in the fore-and-aft direction is susceptible to downward deformation due to the weight of the battery. Moreover, in the arrangement disclosed in Patent Document 1 above, since a recess portion extending in the vehicle width direction is formed in a lid member of the battery case, the stiffness in the vicinity of the recess portion is lowered, and there is a possibility that the intermediate part, in the fore-and-aft direction, of the battery case will be more susceptible to downward deformation.

The present invention has been accomplished in light of the above-mentioned circumstances, and it is an object thereof to prevent a battery case that, in order to avoid interference between a vehicle body frame and a cross member, has a recess portion extending in the vehicle width direction formed therein from being downwardly deformed by the weight of a battery.

Means for Solving the Problems

In order to attain the above object, according to a first aspect of the present invention, there is provided a vehicle mounting structure for batteries in which in order to mount a battery case housing a plurality of batteries on a vehicle body frame comprising a cross member extending in a vehicle width direction, the battery case has formed therein a recess portion extending in the vehicle width direction, and the cross member is disposed within the recess portion, characterized in that the structure comprises fixing means for fixing the recess portion of the battery case to the cross member.

Further, according to a second aspect of the present invention, in addition to the first aspect, the plurality of batteries are electrically connected to each other via a bus bar extending so as to straddle the recess portion, the battery case comprises a battery support member that supports the plurality of batteries from below and a lid member that is joined to the battery support member and covers a top of the plurality of batteries, and the fixing means fixes the battery support member and the lid member to the cross member.

Furthermore, according to a third aspect of the present invention, in addition to the first or second aspect, the lid member is formed from an insulating material.

Moreover, according to a fourth aspect of the present invention, in addition to any one of the first to third aspects, the lid member comprises a cooling air inlet that introduces cooling air for cooling the battery to an interior of the battery case, and the recess portion is positioned beneath or on the upstream side of a flow path of cooling air heading toward the cooling air inlet.

It should be noted here that a middle cross member 20 of an embodiment corresponds to the cross member of the present invention, a battery tray 38 of the embodiment corresponds to the battery support member of the present invention, a battery cover 39 of the embodiment corresponds to the lid member of the present invention, a battery module 42 of the embodiment corresponds to the battery of the present invention, and a bolt 54 of the embodiment corresponds to the fixing member of the present invention.

EFFECTS OF THE INVENTION

In accordance with the first aspect of the present invention, since, when the battery case housing the plurality of batteries is mounted on the vehicle body frame that includes the cross member extending in the vehicle width direction, the cross member of the vehicle body frame is disposed within the recess portion, extending in the vehicle width direction, that is formed in the battery case, it is possible to mount the battery case while avoiding interference with the cross member. Although the intermediate part in the fore-and-aft direction of the battery case housing heavy batteries is susceptible to downward deformation, it is possible to prevent deformation of the battery case by fixing the recess portion of the battery case to the cross member by the fixing means.

Furthermore, in accordance with the second aspect of the present invention, since the battery case is formed from the battery support member, which supports the plurality of batteries from beneath, and the lid member, which is joined to the battery support member and covers a top of the plurality of batteries, and the fixing means fixes the battery support member and the lid member to the cross member, when the vehicle is involved in a collision and the collision load is inputted into the battery case, it is possible to protect the bus bar, which electrically connects the plurality of batteries to each other while straddling the recess portion, by enhancing the strength of the battery case in the vicinity of the recess portion by the fixing means, thus preventing the occurrence of a ground fault.

Moreover, in accordance with the third aspect of the present invention, since the lid member of the battery case is formed from an insulating material, it is possible to prevent a terminal of the battery from grounding to the vehicle body frame via the lid member.

Furthermore, in accordance with the fourth aspect of the present invention, since the lid member includes the cooling air inlet for introducing cooling air for cooling the batteries to the interior of the battery case, and the recess portion of the lid member is positioned beneath or on the upstream of the flow path for cooling air heading toward the cooling air inlet, it is possible to trap dirt or water droplets contained in cooling air in the recess portion, thus preventing them from being sucked into the interior of the battery case.

EXPLANATION OF REFERENCE NUMERALS AND SYMBOLS

11 Vehicle body frame
20 Middle cross member (cross member)
24 Battery case
38 Battery tray (battery support member)
39 Battery cover (lid member)
39b Recess portion
42 Battery module (battery)
48a Cooling air inlet
54 Bolt (fixing means)
57 Bus bar

MODES FOR CARRYING OUT THE INVENTION

Figure 1:
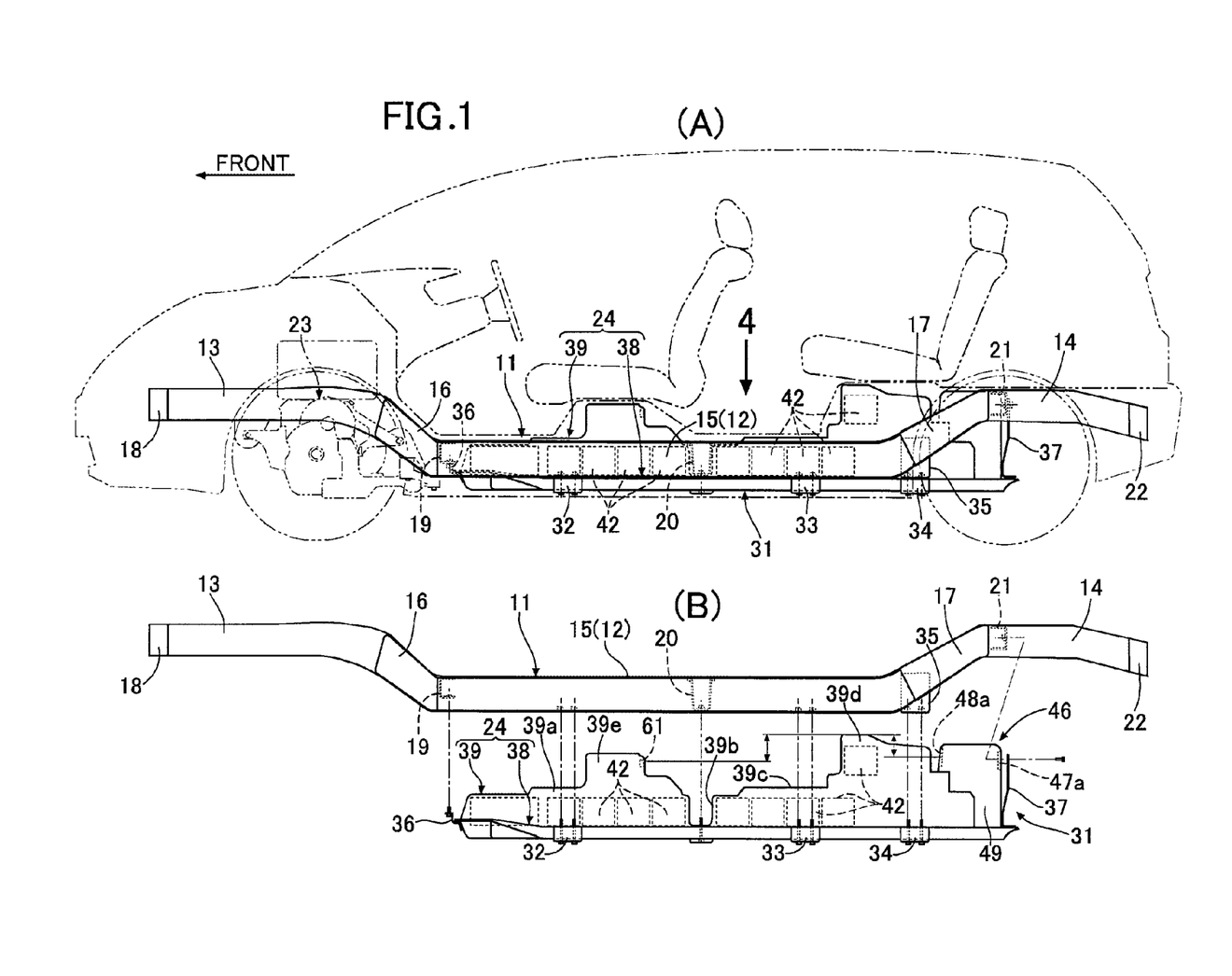
FIG. 1 is a side view of an electric automobile. (first embodiment)
Figure 2:
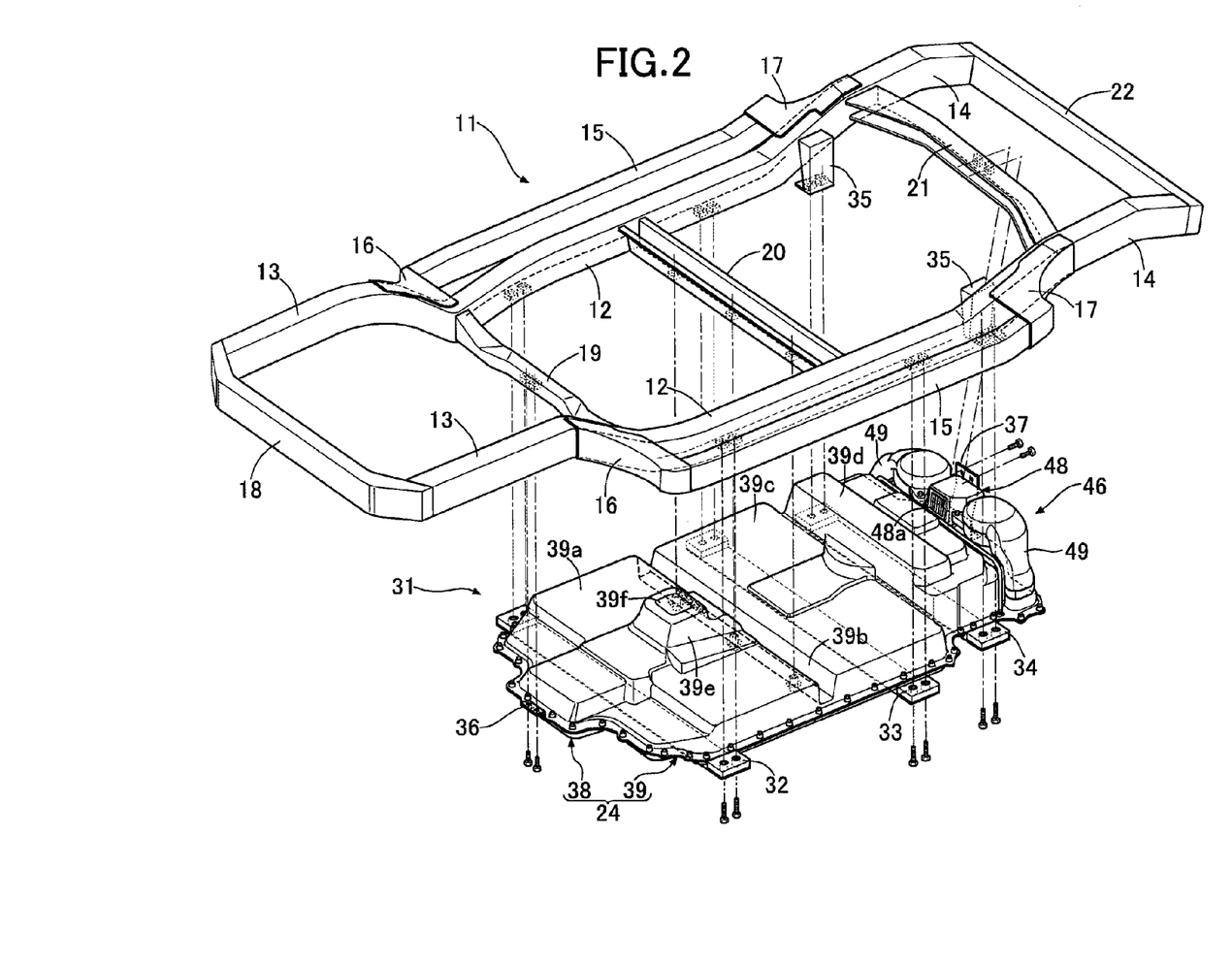
FIG. 2 is a perspective view of a vehicle body frame and a battery pack. (first embodiment)

A mode for carrying out the present invention is explained below by reference to FIG. 1 to FIG. 9.
First Embodiment As shown in FIG. 1 and FIG. 2, a vehicle body frame 11 of an electric automobile includes a pair of left and right floor frames 12 and 12 extending in the vehicle body fore-and-aft direction, a pair of left and right front side frames 13 and 13 extending forwardly from the front ends of the floor frames 12 and 12 while bending upwardly, a pair of left and right rear side frames 14 and 14 extending rearwardly from the rear ends of the floor frames 12 and 12 while bending upwardly, a pair of left and right side sills 15 and 15 disposed outside in the vehicle width direction of the floor frames 12 and 12, a pair of left and right front outriggers 16 and 16 connecting the front ends of the side sills 15 and 15 to the front ends of the floor frames 12 and 12, a pair of left and right rear outriggers 17 and 17 connecting the rear ends of the side sills 15 and 15 to the rear ends of the floor frames 12 and 12, a front bumper beam 18 providing a connection between front end parts of the pair of left and right front side frames 13 and 13 in the vehicle width direction, a front cross member 19 providing a connection between front end parts of the pair of left and right floor frames 12 and 12 in the vehicle width direction, a middle cross member 20 providing a connection between intermediate parts, in the fore-and-aft direction, of the pair of left and right floor frames 12 and 12 in the vehicle width direction, a rear cross member 21 providing a connection between intermediate parts, in the fore-and-aft direction, of the pair of left and right rear side frames 14 and 14 in the vehicle width direction, and a rear bumper beam 22 providing a connection between rear end parts of the pair of left and right rear side frames 14 and 14 in the vehicle width direction.

A battery pack 31, which is a power source for a motor/generator 23 that is a drive source for making the electric automobile travel, is supported so as to be suspended from a lower face of the vehicle body frame 11. That is, fixed to a lower face of the battery pack 31 are a front suspension beam 32, middle suspension beam 33, and rear suspension beam 34 extending in the vehicle width direction, fixed to front parts of the pair of left and right floor frames 12 and 12 are opposite ends of the front suspension beam 32, fixed to rear parts of the pair of left and right floor frames 12 and 12 are opposite ends of the middle suspension beam 33, and fixed to the lower ends of support members 35 and 35 hanging down from front parts of the pair of left and right rear side frames 14 and 14 are opposite ends of the rear suspension beam 34. Furthermore, a middle part, in the vehicle width direction, of the front end of the battery pack 31 is supported on the front cross member 19 via a front bracket 36, and a middle part, in the vehicle width direction, of the rear end of the battery pack 31 is supported on the rear cross member 21 via a rear bracket 37. Moreover, the battery pack 31 is supported on a lower face of the middle cross member 20 in an intermediate position between the front suspension beam 32 and the middle suspension beam 33.

Figure 3:
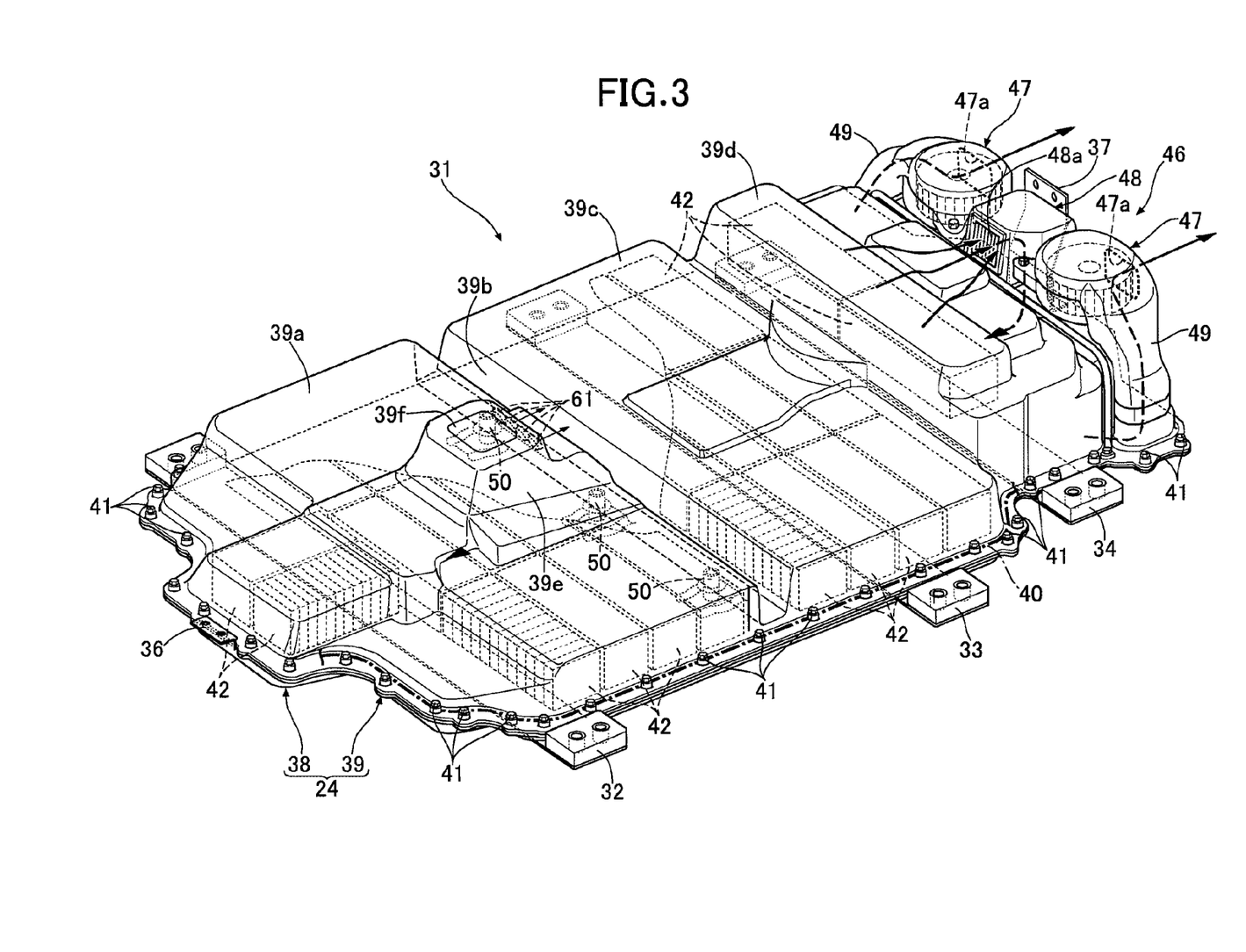
FIG. 3 is a perspective view of the battery pack. (first embodiment)
Figure 4:
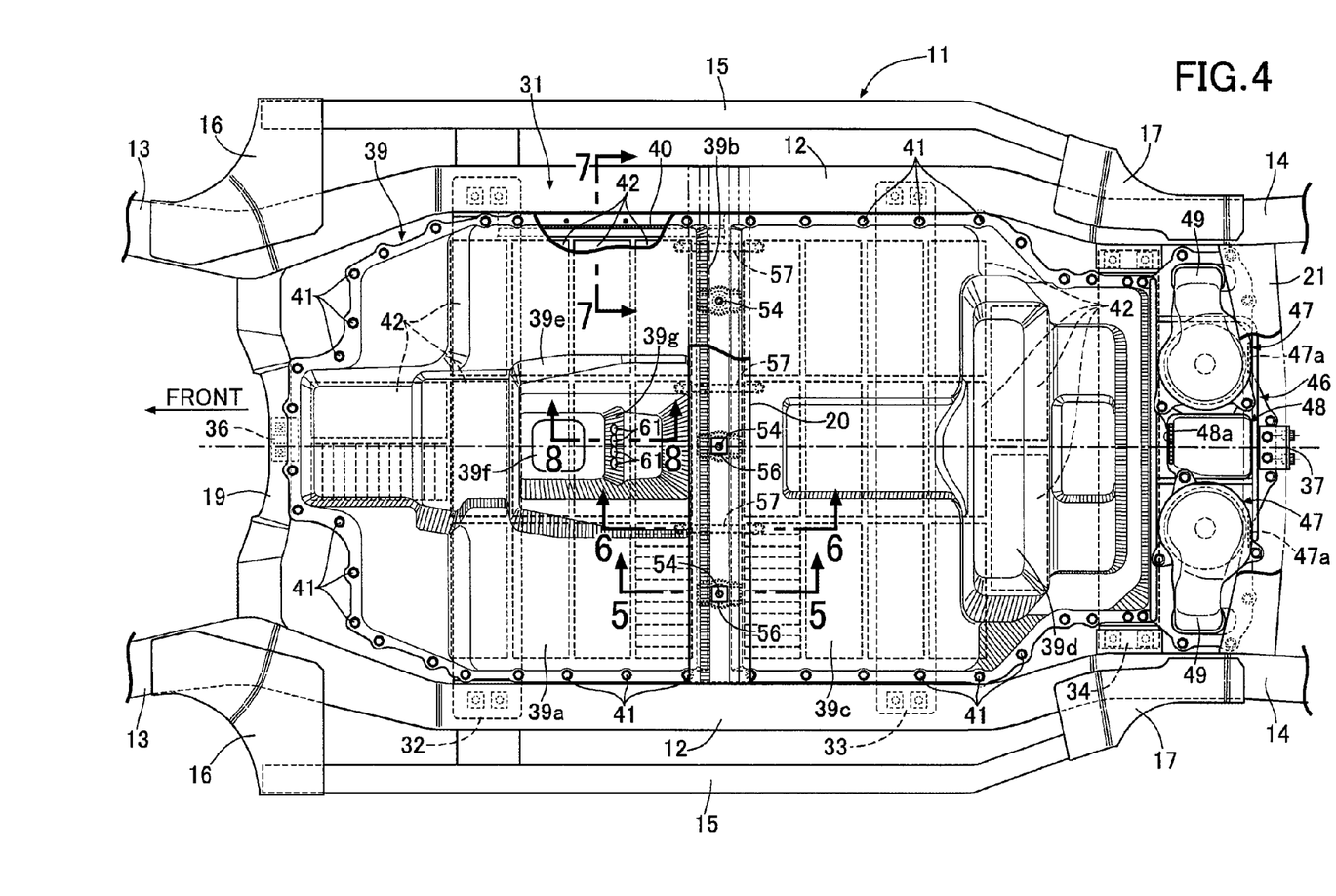
FIG. 4 is a view in the direction of arrow 4 in FIG. 1. (first embodiment)

As shown in FIG. 3 and FIG. 4, the battery pack 31 includes a battery tray 38 made of metal and a battery cover 39, made of a synthetic resin, superimposed on the battery tray 38 from above. A peripheral part of the battery tray 38 and a peripheral part of the battery cover 39 are secured by means of a large number of bolts 41 with a seal member 40 sandwiched therebetween (see FIG. 7), the interior of the battery pack 31 being therefore basically hermetically sealed. A plurality of battery modules 42, in which a plurality of battery cells are stacked in series, are mounted on an upper face of the battery tray 38. The battery tray 38 and the battery cover 39 form a battery case 24 of the present invention.

The battery tray 38 is formed by joining an upper plate 43 and a lower plate 44 with a concavo-convex middle plate 45 sandwiched therebetween (see FIG. 7); a space for cooling air to flow is formed therebetween, and heat exchange is carried out with the battery modules 42, which are in contact with an upper face of the upper plate 43, thus cooling the battery modules 42, which generate heat by charging/discharging.

A cooling device 46 provided in a rear part of the battery pack 31 includes a pair of left and right cooling fans 47 and 47 that are rotated by means of an electric motor, which is not illustrated. The lower end of a suction duct 48 disposed between the pair of left and right cooling fans 47 and 47 is connected to the upstream side of the cooling air passage of the battery tray 38, and lower ends of a pair of left and right discharge ducts 49 and 49 disposed outside in the vehicle width direction of the pair of left and right cooling fans 47 and 47 are connected to the downstream side of the cooling air passage of the battery tray 38. Therefore, when the cooling fans 47 and 47 are driven, cooling air that has been sucked in via the cooling air inlet 48a of the suction duct 48 is supplied to the interior of the battery tray 38, carries out heat exchange with the battery modules 42 while flowing through the interior of the battery tray 38, then passes from the discharge ducts 49 and 49 through to the cooling fans 47 and 47, and is discharged via cooling air discharge ports 47a and 47a.

The battery cover 39 of the battery case 24 includes, from the front thereof to the rear, a first projecting portion 39a, a recess portion 39b, a second projecting portion 39c, and a third projecting portion 39d. A plurality of battery modules 42 are housed in the interior of the upwardly protruding first projecting portion 39a. A main switch (not illustrated) of the battery pack 31 is housed in the interior of a bulge portion 39e protruding further upwardly from an upper face of the first projecting portion 39a, and an access panel 39f for operating the main switch is provided on an upper face of the bulge portion 39e.

A plurality of battery modules 42 are housed in the interior of the second projecting portion 39c. Two battery modules 42 are housed in the interior of a front portion of the third projecting portion 39d, whose position is stepped higher, and a junction board (not illustrated) is housed in its rear portion. The recess portion 39b extends in a groove-shape in the vehicle width direction, the vertical thickness of the battery pack 31 being the thinnest in that portion.

Figure 5:
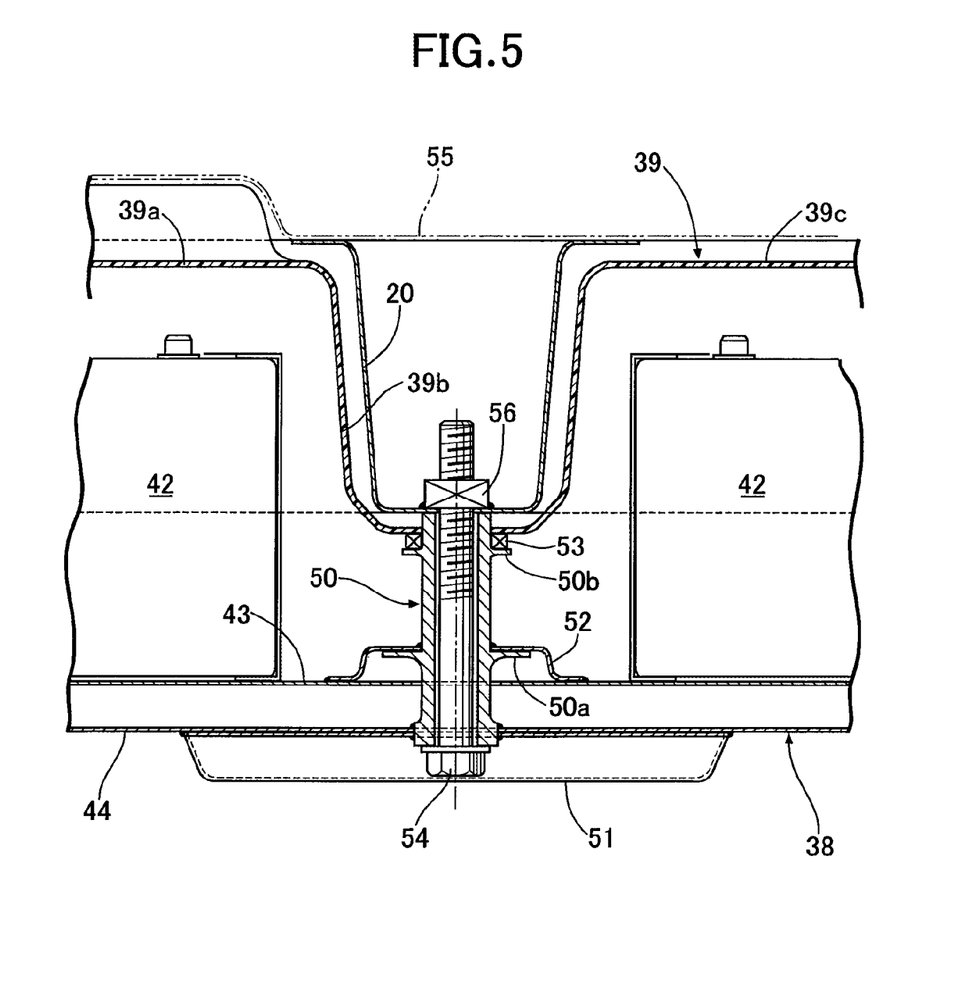
FIG. 5 is a sectional view along line 5-5 in FIG. 4. (first embodiment)
Figure 6:
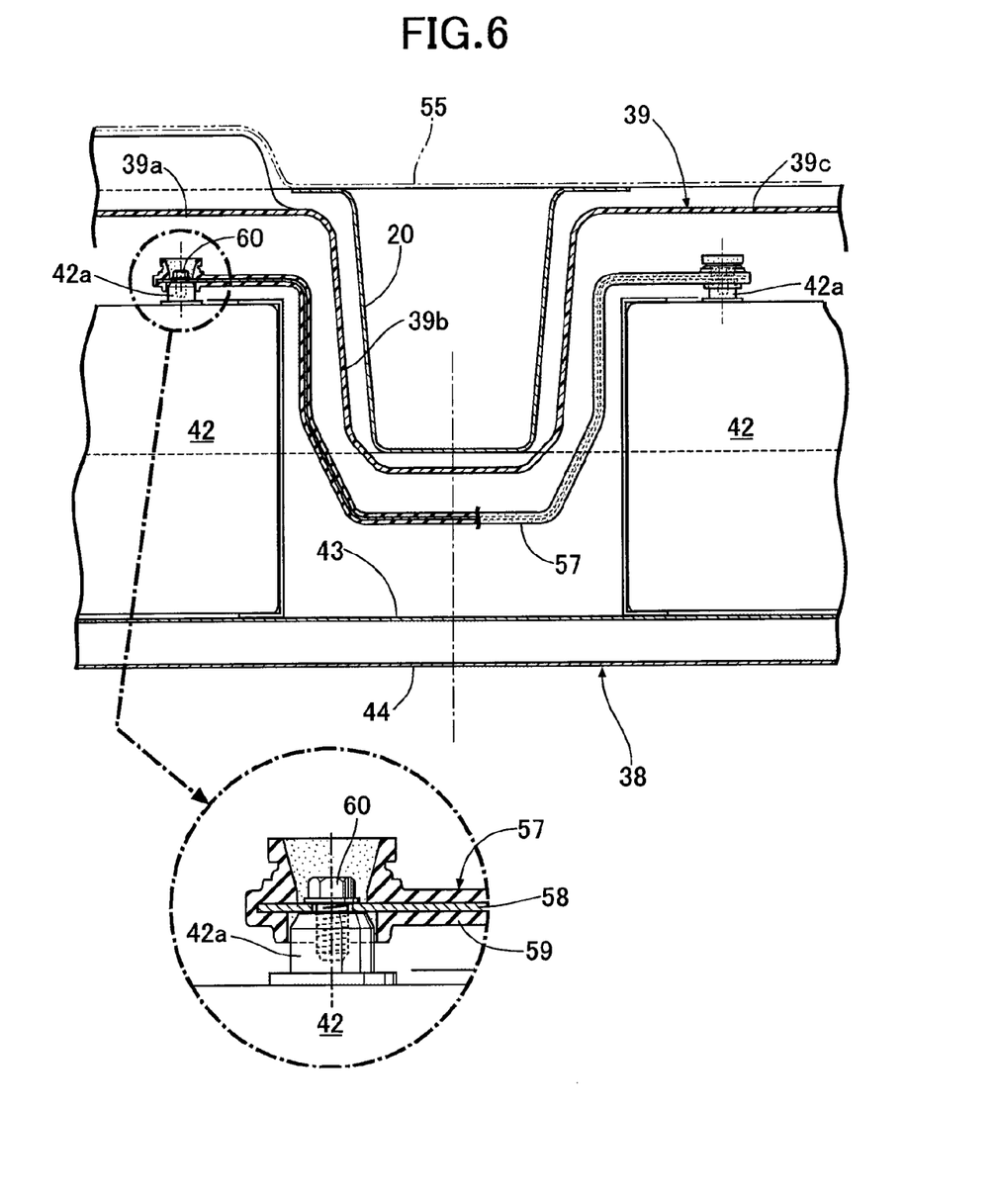
FIG. 6 is a sectional view along line 6-6 in FIG. 4. (first embodiment)
Figure 7:
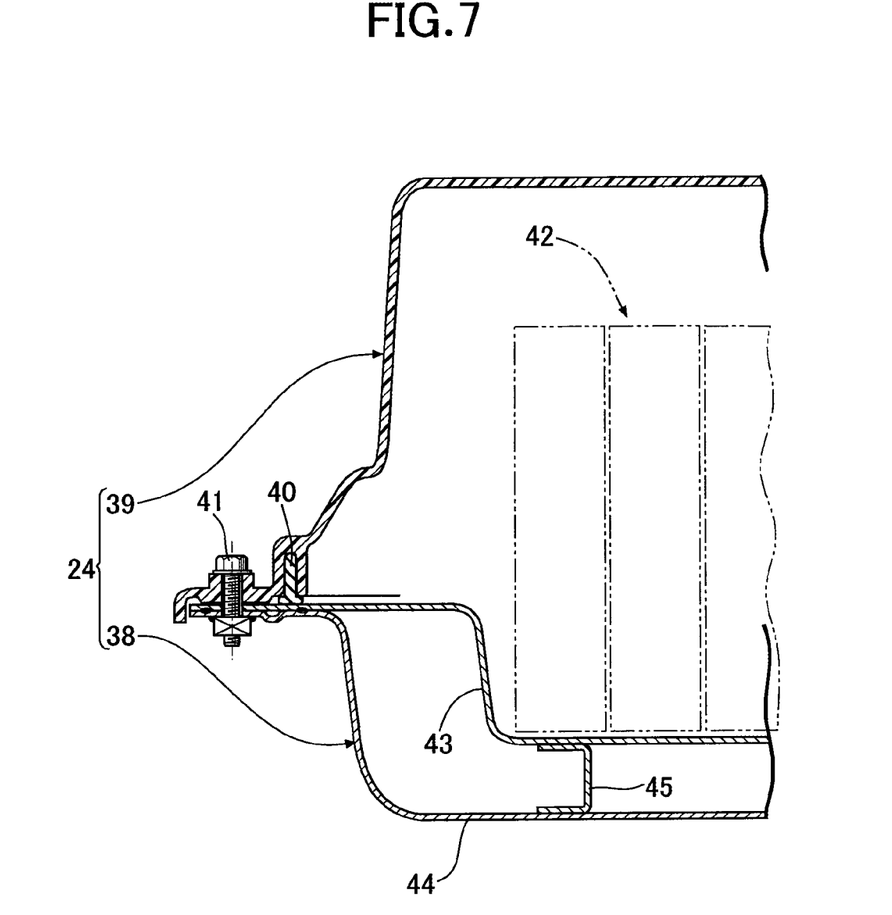
FIG. 7 is a sectional view along line 7-7 in FIG. 4. (first embodiment)

As shown in FIG. 3, FIG. 5, and FIG. 6, three collars 50 extending in the vertical direction are disposed between the recess portion 39b of the battery cover 39 and the battery tray 38. The lower end of the collar 50 is fixed to the lower plate 44 of the battery tray 38 and a reinforcing member 51 fixed to a lower face thereof, a flange 50a formed in an intermediate part of the collar 50 is fixed to a lower face of a reinforcing member 52 fixed to an upper face of the upper plate 43 of the battery tray 38, and a seal member 53 is disposed between a flange 50b provided in an upper part of the collar 50 and a lower face of the recess portion 39b of the battery cover 39. Three bolts 54 extending through the three collars 50 are screwed into weld nuts 56 welded to an upper face of the middle cross member 20 fixed to a lower face of a floor panel 55. Since the tightening force of the bolts 54 is supported by the collars 50, the battery case 24 is strongly fixed to a lower face of the middle cross member 20 without being crushed.

Terminals 42a of the battery modules 42 disposed in the fore-and-aft direction with the recess portion 39b of the battery cover 39 sandwiched therebetween are connected to each other via bus bars 57 bent into an inverted Ω shape. The bus bar 57 is formed by covering a metal wire 58 with a synthetic resin covering material 59, opposite ends thereof being fixed to the terminals 42a and 42a of the battery modules 42 and 42 by means of bolts 60 and 60.

Figure 8:
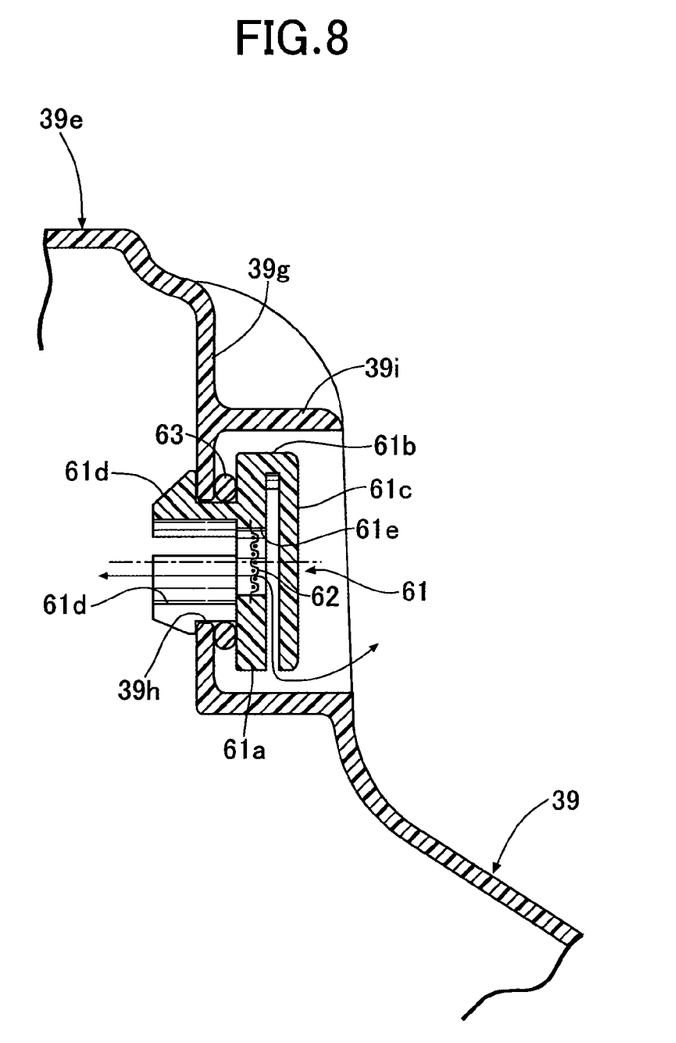
FIG. 8 is a sectional view along line 8-8 in FIG. 4. (first embodiment)
Figure 9:
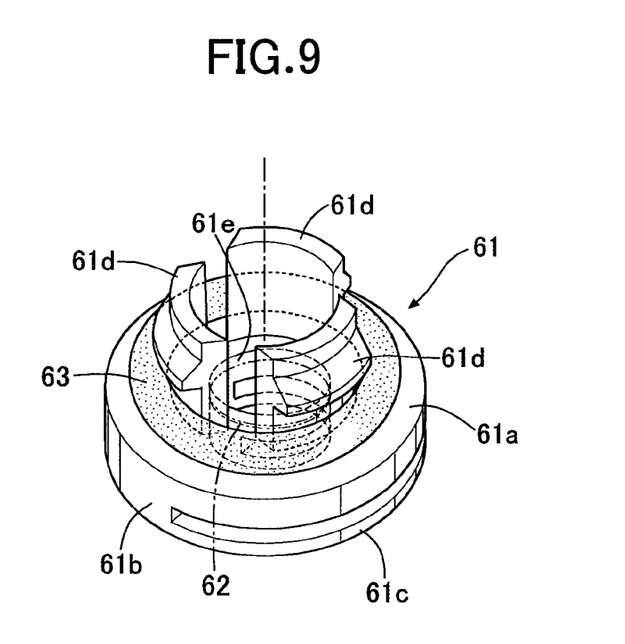
FIG. 9 is a perspective view of a breather hole-forming member. (first embodiment)

As shown in FIG. 4, FIG. 8, and FIG. 9, a plurality of breather hole-forming members 61 are arranged side by side in the left-and-right direction on a wall face 39g standing substantially vertically on the rear side of the bulge portion 39e of the first projecting portion 39a of the battery cover 39. The breather hole-forming member 61 includes a disc-shaped main body portion 61a, a disc-shaped cover portion 61c that is linked to an upper part of the main body portion 61a via a linking portion 61b and faces the outer face side of the main body portion 61a, and three claw portions 61d protruding from the reverse face side of the main body portion 61a, a Gore-tex (registered trademark) etc. breather member 62 being provided in a circular breather hole 61e formed in the middle of the main body portion 61a. The breather member 62 has the function of allowing air to pass through and preventing moisture or dust from passing through.

The breather hole-forming member 61 is fixed to an opening 39h formed in a wall face 39g of the battery cover 39 by means of the three claw portions 61d with an O ring 63 sandwiched therebetween. An upper part of the breather hole-forming member 61 fixed to the wall face 39g is covered by a canopy portion 39i protruding rearwardly from the wall face 39g.

The operation of the embodiment of the present invention having the above arrangement is now explained.

In order to mount the battery pack 31, which is fabricated in advance as an assembly, on the vehicle body frame 11 from below, opposite ends of the front suspension beam 32 and opposite ends of the middle suspension beam 33 are fixed to the floor frames 12 and 12, opposite ends of the rear suspension beam 34 are fixed to the rear side frames 14 and 14 via the support members 35 and 35, and the front bracket 36 and the rear bracket 37 are fixed to the front cross member 19 and the rear cross member 21 respectively. In this arrangement, since the recess portion 39b is formed in the intermediate part, in the fore-and-aft direction, of the battery cover 39 of the battery pack 31, when the battery pack 31 is mounted on the vehicle body frame 11, the middle cross member 20 of the vehicle body frame 11 is fitted into the recess portion 39b of the battery cover 39, thus enabling the battery pack 31 to be mounted without interfering with the vehicle body frame 11.

Since the battery case 24 has a shape that is long in the vehicle body fore-and-aft direction and, moreover, the synthetic resin battery cover 39 contributes hardly anything to the stiffness of the battery case 24, there is the problem that the battery tray 38, which is thin, is deformed by the weight of the battery modules 42, thus causing the intermediate part in the fore-and-aft direction of the battery case 24 to warp downwardly. However, in accordance with the present embodiment, since the battery case 24 is fixed to the lower face of the middle cross member 20 by the three bolts 54 at the position of the recess portion 39b of the battery cover 39, the weight of the battery pack 31 can be supported by the middle cross member 20, which is a high stiffness strengthening member, and it is thereby possible to reliably prevent the intermediate part in the fore-and-aft direction of the battery case 24 from warping downwardly.

Furthermore, since the bolts 54 extend through both the battery tray 38 and the battery cover 39 of the battery case 24 and fix them to the middle cross member 20, when a collision load due to a collision of the vehicle is inputted into the battery case 24, it is possible to protect the bus bars 57, which electrically connect the front and rear battery modules 42 while straddling the recess portion 39b, by enhancing the strength of the battery case 24 in the vicinity of the recess portion 39b by means of the bolts 54, thus preventing the occurrence of a ground fault. Moreover, the battery cover 39 of the battery case 24 is disposed at a position close to the terminals 42a of the battery modules 42, but since the battery cover 39 is formed from an electrically nonconductive synthetic resin, it is possible to prevent the terminals 42a of the battery modules 42 from being grounded to the vehicle body frame 11 via the battery cover 39.

Furthermore, when the cooling fans 47 and 47 of the cooling device 46 operate, cooling air flowing along the upper face of the battery cover 39 is sucked in via the cooling air inlet 48a opening on the front face of suction duct 48 forming part of the battery cover 39, and since the third projecting portion 39d extending in the vehicle width direction is present on the battery cover 39 in front of the cooling air inlet 48a, it is possible to trap dirt or water droplets contained in cooling air flowing along the upper face of the battery cover 39 by means of the third projecting portion 39d, thus preventing them from being sucked into the interior of the battery case 24.

Since the battery case 24 is a hermetically closed container in which the battery cover 39 is joined to the battery tray 38 via the seal member 40, when the battery modules 42 housed therewithin generate heat due to charging/discharging, the internal pressure increases, and when it is cooled due to charging/discharging being stopped the internal pressure decreases. Because of this, there is a possibility of water or dirt entering the interior of the battery case 24 due to the sealing function of the seal member 40 being degraded by deformation of the battery cover 39 or by an increase in the pressure in the direction of water entering the seal member 40 as a result of decrease in the internal pressure of the battery case 24.

However, in accordance with the present embodiment, when the internal pressure of the battery case 24 increases, air is discharged through the breather holes 61e of the breather hole-forming members 61, when the internal pressure of the battery case 24 decreases, air is sucked in through the breather holes 61e of the breather hole-forming members 61, and it is thus possible to maintain the internal pressure of the battery case 24 at atmospheric pressure, thereby protecting the seal member 40. In this arrangement, since the breather holes 61e of the breather hole-forming members 61 are provided with the breather members 62, which allow air to pass through but do not allow moisture or dust to pass through, it is possible to prevent moisture or dust from entering the interior of the battery case 24.

Furthermore, since the breather hole-forming members 61 are provided in the wall face 39g to the rear of the first projecting portion 39a of the battery cover 39, that is, the wall face 39g facing the downstream side in the direction of flow of cooling air, it is possible to make it difficult for dirt or water droplets contained in cooling air to enter the interior of the battery case 24 via the breather hole-forming members 61. Moreover, since the wall face 39g rises substantially vertically and has the canopy portion 39i protruding thereabove, it is possible to make it difficult for rain water, etc. flowing along the wall face 39g to flow into the interior of the battery case 24 through the breather hole-forming members 61. Furthermore, since the third projecting portion 39d of the battery case 24 rises so as to intersect the line joining the cooling air inlet 48a opening forward of the cooling device 46 and the breather hole-forming members 61 provided in the rearwardly-facing wall face 39g of the first projecting portion 39a, it is possible to prevent air in the interior of the battery case 24 from being sucked out by making it difficult for negative pressure generated in the cooling air inlet 48a to act on the breather hole-forming members 61. Moreover, since the breather holes 61e of the breather hole-forming members 61 are covered by the cover portions 61c, not only is it possible to more reliably provide shielding from rain water, etc., but it is also possible to prevent damage such as that from insects like ants entering and biting holes in the breather members 62.

An embodiment of the present invention is explained above, but the present invention may be modified in a variety of ways as long as the modifications do not depart from the spirit and scope thereof For example, the battery cover 39 of the embodiment is formed from one member, but it may be divided into two in the fore-and-aft direction at the position of the recess portion 39b.

Furthermore, the fixing member of the present invention is not limited to the bolt 54 of the embodiment, and any fixing member such as a clamp or a clip may be employed.

Moreover, in the embodiment the recess portion 39b is disposed beneath the flow path, through which cooling air flows into the cooling air inlet 48a, but if the recess portion 39b is disposed on the upstream side of the flow path of cooling air (that is, on the flow path of cooling air) flowing into the cooling air inlet 48a, the same effect can be achieved without it necessarily being disposed therebeneath.

The invention claimed is:

1. A vehicle mounting structure for batteries in which in order to mount a battery case housing a plurality of batteries on a vehicle body frame comprising a cross member extending in a vehicle width direction, the battery case has formed therein a recess portion extending in the vehicle width direction, and the cross member is disposed within the recess portion,
    wherein the structure comprises a fixing member for fixing the recess portion of the battery case to the cross member,
    the battery case comprises a battery support member that supports the plurality of batteries from below and a lid member that is joined to the battery support member, the lid member covering a top of the plurality of batteries and having the recess portion,
    a collar penetrates through the battery support member and the lid member and faces at a tip end thereof the cross member,
    the fixing member is inserted through an inside of the collar,
    the battery support member comprises a plate supporting the batteries thereon, and a reinforcing member is fixed to the plate, and
    the collar is provided with a flange which extends parallel with the reinforcing member, the reinforcing member being positioned closer to the cross member than the flange.

2. The vehicle mounting structure for batteries according to claim 1, wherein the plurality of batteries are electrically connected to each other via a bus bar extending so as to straddle the recess portion, and the fixing member fixes the battery support member and the lid member to the cross member.

3. The vehicle mounting structure for batteries according to claim 2, wherein the lid member is formed from an insulating material.

4. The vehicle mounting structure for batteries according to claim 1, wherein the lid member is formed from an insulating material.

5. The vehicle mounting structure for batteries according to claim 1, wherein the lid member comprises a cooling air inlet that introduces cooling air for cooling the battery to an interior of the battery case, and the recess portion is positioned beneath or on the upstream side of a flow path of cooling air heading toward the cooling air inlet.

6. The vehicle mounting structure for batteries according to claim 1, wherein the flange extends parallel with the lid member and a seal member is disposed between the lid member and the flange.

* * * * *